United States Patent
Fujita (10) Patent No.: US 7,726,677 B2
(45) Date of Patent: Jun. 1, 2010

(54) SADDLE RIDING TYPE VEHICLE HAVING STEERING DAMPER

(75) Inventor: Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 12/019,924

(22) Filed: Jan. 25, 2008

(65) Prior Publication Data

US 2008/0179856 A1 Jul. 31, 2008

(30) Foreign Application Priority Data

Jan. 30, 2007 (JP) ............................. 2007-019823

(51) Int. Cl.
*B62K 21/08* (2006.01)

(52) U.S. Cl. ...................... 280/272; 188/290

(58) Field of Classification Search ................ 280/272, 280/271, 268, 89, 90; 188/290
See application file for complete search history.

(56) References Cited

U.S. PATENT DOCUMENTS 7,258,356 B2 * 8/2007 Okazaki et al. ............. 280/272

2005/0017477 A1 * 1/2005 Sato et al. .................... 280/272
2006/0207845 A1 * 9/2006 Gogo et al. .................. 188/290
2006/0220340 A1 * 10/2006 Seki et al. .................... 280/272

FOREIGN PATENT DOCUMENTS

| EP | 0 900 722 A2 | 3/1999 |
| EP | 1 707 483 A1 | 10/2006 |
| JP | 2005-170074 | 6/2005 |

* cited by examiner

*Primary Examiner*—Tony H. Winner
(74) *Attorney, Agent, or Firm*—Birch, Stewart, Kolasch & Birch, LLP (57) ABSTRACT

A vehicle body is made to be more compact by disposing a steering damper at an even lower position. A top bridge includes a steering damper mounting portion, on which a steering damper is mounted, disposed rearwardly of a head pipe and downwardly of an upper surface of the top bridge. The steering damper includes a steering damper main body disposed on upper portions of main frames and a first link mounted on an input shaft of the steering damper main body and extending in a forward direction of a vehicle body. The steering damper mounting portion and the first link are pivotally movably connected to each other via a second link.

18 Claims, 7 Drawing Sheets

SADDLE RIDING TYPE VEHICLE HAVING STEERING DAMPER

CROSS-REFERENCE TO RELATED APPLICATIONS

The present application claims priority under 35 USC 119 to Japanese Patent Application No. 2007-019823 filed on Jan. 30, 2007 the entire contents of which are hereby incorporated by reference.

BACKGROUND OF THE INVENTION

1. Field of the Invention

The present invention relates to an improved saddle riding type vehicle having a steering damper.

2. Description of Background Art

A known arrangement of a saddle riding type vehicle having a steering damper includes a steering damper disposed between a vehicle body frame and a top bridge that connects left and right portions on an upper end of a front fork. See, for example, Japanese Patent Laid-open No. 2005-170074.

In this arrangement, the saddle riding type vehicle includes a steering damper which will be described below with reference to FIG. 2 of Japanese Patent Laid-open No. 2005-170074.

A steering damper 41 includes a damper base portion 82, a damper main body 84, and a link mechanism 87. The damper base portion 82 is disposed on upper portions at front ends of a pair of left and right main frames 21, 22 (reference numeral 22 is not shown) that constitute a vehicle body frame. The damper main body 84 is disposed at an upper portion of the damper base portion 82. The link mechanism 87 has a first end disposed on an input shaft 86 included in the damper main body 84 and a second end swingably disposed on an upper surface of a top bridge 15 of a front fork.

If the steering damper 41 is disposed at a high level at the front portion of a vehicle body, a front cover 66 covering an area upward of the steering damper 41 is also disposed at a high level, resulting in a large front portion of the vehicle body.

SUMMARY AND OBJECTS OF THE INVENTION

It is an object of an embodiment of the present invention to make the front portion of the vehicle body more compact by disposing the steering damper at an even lower position.

According to an embodiment of the present invention, there is provided a saddle riding type vehicle having a steering damper. The vehicle includes a vehicle body frame, a head pipe, a front fork, and a top bridge. More specifically, the head pipe is disposed at a front end of the vehicle body frame. The front fork, which supports a front wheel, is steerably disposed on the head pipe. The top bridge connects left and right upper ends of the front fork. In this vehicle, the steering damper is interposed between the top bridge and the vehicle body frame. Further, the top bridge includes a steering damper mounting portion, to which the steering damper is mounted, disposed rearwardly of the head pipe and downwardly of an upper surface of the top bridge. The steering damper includes a steering damper main body disposed on an upper portion of the vehicle body frame and a first link disposed on an input shaft of the steering damper main body. The first link extends in a forward direction of a vehicle body. The steering damper mounting portion and the first link are pivotally movably connected to each other.

The steering damper mounting portion, to which the steering damper is mounted, is disposed downwardly of the upper surface of the top bridge. Further, the steering damper mounting portion and the first link, which is mounted on the input shaft of the steering damper main body and extends in the forward direction, are pivotally movably connected to each other. Accordingly, the steering damper can be disposed at a position lower than prior art arrangements. The steering damper, disposed at a lower position, allows a cover covering the area upward of the steering damper to be disposed at a lower position.

According to an embodiment of the present invention, the steering damper mounting portion and the first link are connected via a second link. Further, the second link is disposed downwardly of the steering damper mounting portion and the first link.

Since the second link is disposed downwardly of the steering damper mounting portion and the first link, the steering damper can be disposed at a position lower than in an arrangement, for example, wherein the second link is disposed upwardly of the steering damper mounting portion and the first link.

According to an embodiment of the present invention, the second link extends in a vehicle width direction when the front wheel is steered into a straight ahead position.

Accordingly, with the front wheel in the straight ahead position, the second link extends in the vehicle width direction. The second link becomes therefore shorter in a longitudinal direction of the vehicle. Even if the first link is made to have an overall length by extending the first link in the longitudinal direction, the steering damper can be disposed even more forwardly in the vehicle.

According to an embodiment of the present invention, the steering damper mounting portion and a connection of the first link to the second link are disposed opposite to each other relative to a vehicle body centerline extending in the longitudinal direction of the vehicle body when the front wheel is steered into the straight ahead position.

With the front wheel in the straight ahead position, the steering damper mounting portion and the connection of the first link to the second link are disposed opposite to each other relative to the vehicle body centerline. The second link is therefore disposed more toward the center in the vehicle width direction.

According to an embodiment of the present invention, the top bridge includes the steering damper mounting portion, to which the steering damper is mounted, disposed rearwardly of the head pipe and downwardly of the upper surface of the top bridge. The steering damper includes the steering damper main body disposed on the upper portion of the vehicle body frame and the first link disposed on the input shaft of the steering damper main body. The first link extends in the forward direction of the vehicle body. The steering damper mounting portion and the first link are pivotally movably connected to each other. Accordingly, the steering damper can be disposed at an even lower position and the cover for covering the steering damper can also be disposed at a lower position. This allows the front portion of the vehicle body of the saddle riding type vehicle to be built even more compactly.

According to an embodiment of the present invention, the steering damper mounting portion and the first link are connected via the second link. Further, the second link is disposed downwardly of the steering damper mounting portion and the first link. The steering damper can be disposed at an even lower position.

According to an embodiment of the present invention, the second link extends in the vehicle width direction when the front wheel is steered into the straight ahead position. Accordingly, the steering damper can be disposed at a position even closer to the top bridge while ensuring a sufficient overall length of the first link. The area around the head pipe can therefore be built even more compactly.

According to an embodiment of the present invention, the steering damper mounting portion and the connection of the first link to the second link are disposed opposite to each other relative to the vehicle body centerline extending in the longitudinal direction of the vehicle body when the front wheel is steered into the straight ahead position. The second link can therefore be disposed more toward the center in the vehicle width direction. The area around the head pipe can therefore be built even more compactly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described below with reference to the accompanying drawings. The drawings should be viewed in the direction of reference numerals.

Figure 1:
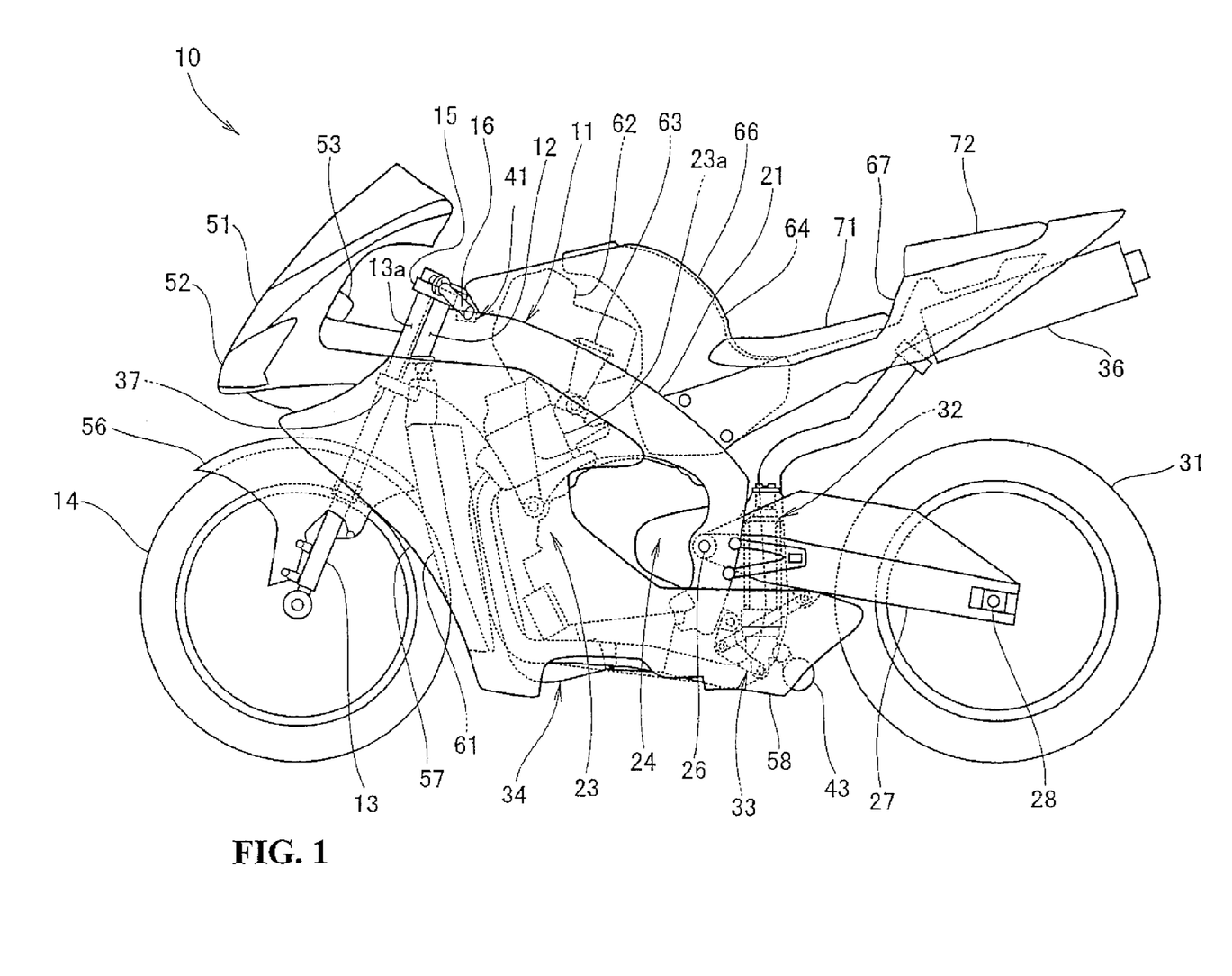
FIG. 1 is a side elevational view showing a saddle riding type vehicle according to an embodiment of the present invention.

FIG. 1 is a side elevational view showing a saddle riding type vehicle according to an embodiment of the present invention. A saddle riding type vehicle 10 is a motorcycle. The motorcycle includes a front fork 13 steerably disposed on a head pipe 12 disposed at a front end of a vehicle body frame 11. A front wheel 14 is rotatably mounted at a lower end of the front fork 13. A top bridge 15 is disposed across left and right upper ends of the front fork 13. A pair of left and right handlebars 16, 17 (only reference numeral 16 representing the handlebar on a proximal side is shown) is mounted on the top bridge 15. An engine 23 and a transmission 24 are mounted on a pair of left and right main frames 21, 22 (only reference numeral 21 representing the main frame on the proximal side is shown) that extend obliquely downwardly toward the rear from the head pipe 12. The transmission 24 is integrally disposed on a rear portion of the engine 23. A rear fork 27 is swingably mounted on a pivot 26 disposed at rear lower portions of the main frames 21, 22. A rear wheel 31 is mounted rotatably on a rear end of the rear fork 27 via a rear axle (rear wheel axle) 28. A rear shock absorber 32 has an upper end fitted to an upper portion of the rear fork 27. Further, the rear shock absorber 32 has a lower end mounted via a link mechanism 33 on a cross pipe (not shown) disposed transversely at the lower portions of the main frames 21, 22. An exhaust pipe assembly 34 including a plurality of exhaust pipes extends rearwardly from a cylinder head 23a of the engine 23. Further, a muffler 36 is connected to a rear end of the exhaust pipe assembly 34.

The front fork 13 includes a pair of left and right forks 13a, 13b (only reference numeral 13a representing the fork on the proximal side is shown). The forks 13a, 13b have upper ends connected to each other by the top bridge 15. The forks 13a, 13b are connected together by a bottom bridge 37 at a position downward of the top bridge 15. A steering stem (steering shaft; not shown) extends vertically across the top bridge 15 and the bottom bridge 37. The steering stem is disposed rotatably in the head pipe 12.

The main frames 21, 22 are a member constituting the vehicle body frame 11. A steering damper 41 is disposed at a position near the head pipe 12 of the main frames 21, 22.

The steering damper 41 is a device that suppresses, for example, a sudden shake of the handlebars occurring when an external force is applied to the front wheel 14 from a road surface during operation. More specifically, the steering damper 41 lessens what is called "kickback (reaction)."

The rear shock absorber 32 has a reservoir tank 43 disposed at a lower portion thereof The reservoir tank 43 stores oil that flows in and out of the cylinder.

As illustrated in FIG. 1, an upper cowl 51 is provided together with a headlamp 52 and a meter 53 disposed forwardly of the head pipe 12. A front fender 56 is provided together with a middle cowl 57 and a lower cowl 58. A radiator 61 is provided together with an intake box 62 for temporarily storing air drawn by an intake system 63 of the engine 23 and a fuel tank 64. A front cover 66 covers the intake box 62 and the fuel tank 64. A seat cowl 67 is fitted to the main frames 21, 22 with seats 71, 72.

Figure 2:
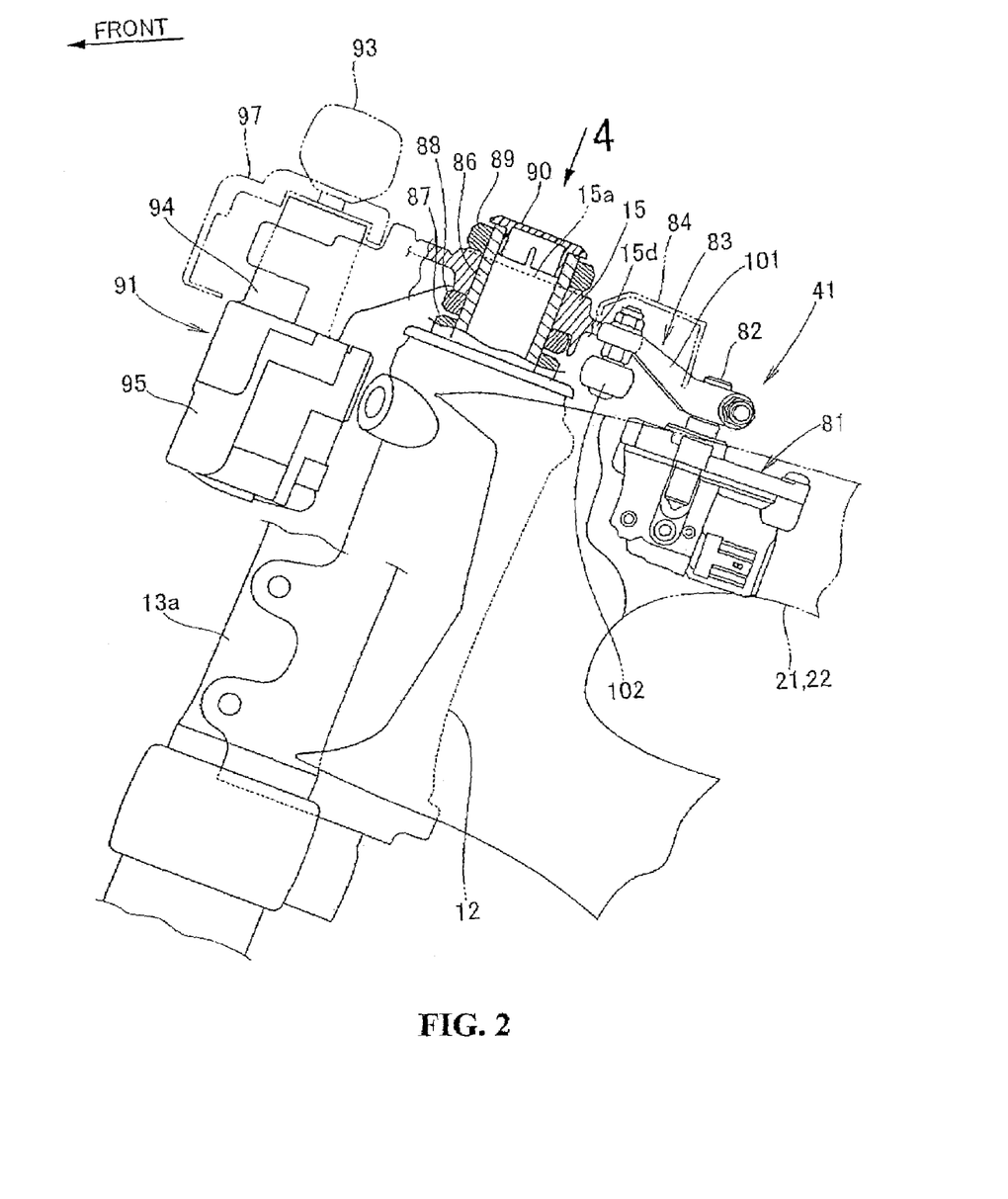
FIG. 2 is a principal side elevational view showing a condition, in which a steering damper according to the embodiment of the present invention is mounted.

FIG. 2 is a principal side elevational view that illustrates a partial cross-sectional view with an arrow (FRONT) indicating the forward direction of the vehicle. As illustrated in FIG. 2, the steering damper 41 according to an embodiment of the present invention is mounted. The steering damper 41 includes a steering damper main body 81 and a link mechanism 83. The steering damper main body 81 is disposed at front portions of the main frames 21, 22. The link mechanism 83 has a first end connected to an input shaft 82 included in the steering damper main body 81 and a second end connected to a rear portion of the top bridge 15. In FIG. 2, a link cover 84 is provided for covering part of the link mechanism 83.

A hollow steering stem 86 inserted in the head pipe 12 is locked in position in the head pipe 12 by a first nut 87. Further, the steering stem 86 is mounted to the top bridge 15 with a second nut 88 and a third nut 89. In FIG. 2, a cap 90 is fitted to an upper end of the steering stem 86.

A main switch 91 is mounted on a front portion of the top bridge 15.

The main switch 91 includes a key cylinder 94 and a switch portion 95. A key 93 is inserted into the key cylinder 94. The switch portion 95 is disposed on a lower portion of the key cylinder 94. In FIG. 2, a switch cover 97 is provided for covering an area upward of the main switch 91.

Figure 3:
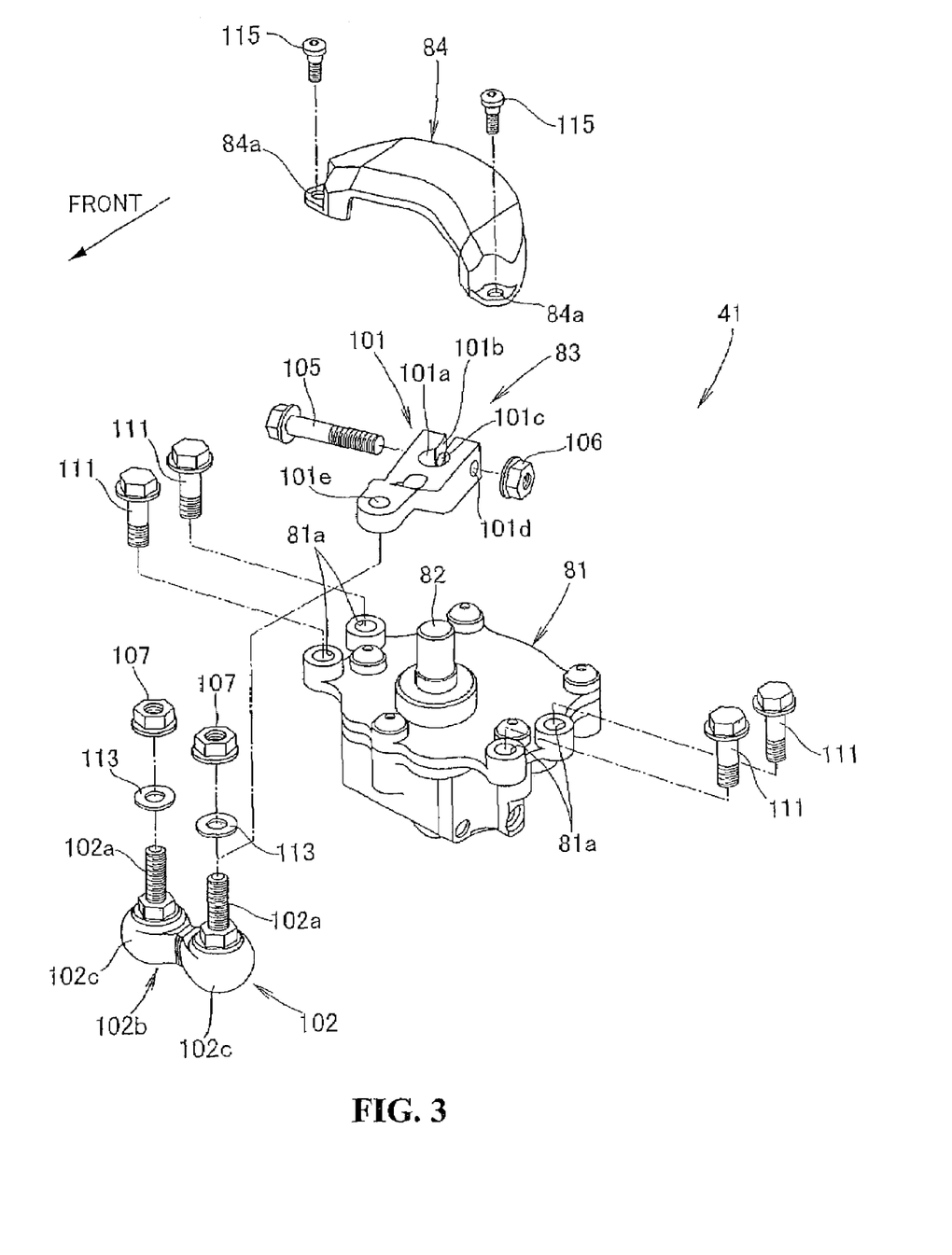
FIG. 3 is an exploded perspective view showing the steering damper according to the embodiment of the present invention.

FIG. 3 is an exploded perspective view showing the steering damper 41 according to an embodiment of the present invention. The steering damper 41 includes the steering damper main body 81 and the link mechanism 83. The link mechanism 83 includes a first link 101 and a second link 102. The first link 101 has a first end secured to the input shaft 82 with a bolt 105 and a nut 106. The second link 102 is secured to a second end of the first link 10 with a nut 107.

The steering damper main body 81 includes four bolt insertion holes 81a made therein. The steering damper main body 81 is mounted to the main frames 21, 22 by screwing bolts 111 inserted in the bolt insertion holes 81a into internal threads (not shown) included on the side of the main frames 21, 22 (see FIG. 2).

The steering damper main body 81 includes oil packed therein and a resistance plate (not shown) disposed in the oil and mounted on the input shaft 82. The steering damper main body 81 exhibits a shock absorbing effect with a resistance force that develops as the resistance plate oscillates in the oil having a high viscosity as a result of a rotational force being transmitted from the link mechanism 83 to the input shaft 82.

The first link 101 includes a shaft insertion hole 101a, a slit 101b, and bolt insertion holes 101c, 101d, 101e. The input shaft 82 is inserted into the shaft insertion hole 101a. The slit 101b communicates with the shaft insertion hole 101a. The bolt insertion holes 101c, 101d extend perpendicularly to the slit 101b. A bolt member 102a included in the second link 102 is passed through the bolt insertion hole 101e.

The second link 102 includes a pair of bolt members 102a, 102a, nuts 107, 107 screwed into the bolt members 102a, 102a, and a cover member 102b formed of rubber covering a joint portion. In FIG. 3, a washer 113 is provided.

The link cover 84 can be secured to the top bridge 15 (see FIG. 2) using screws 115, 115. In FIG. 3, a screw insertion hole 84a is provided through which the screw 115 is passed.

Figure 4:
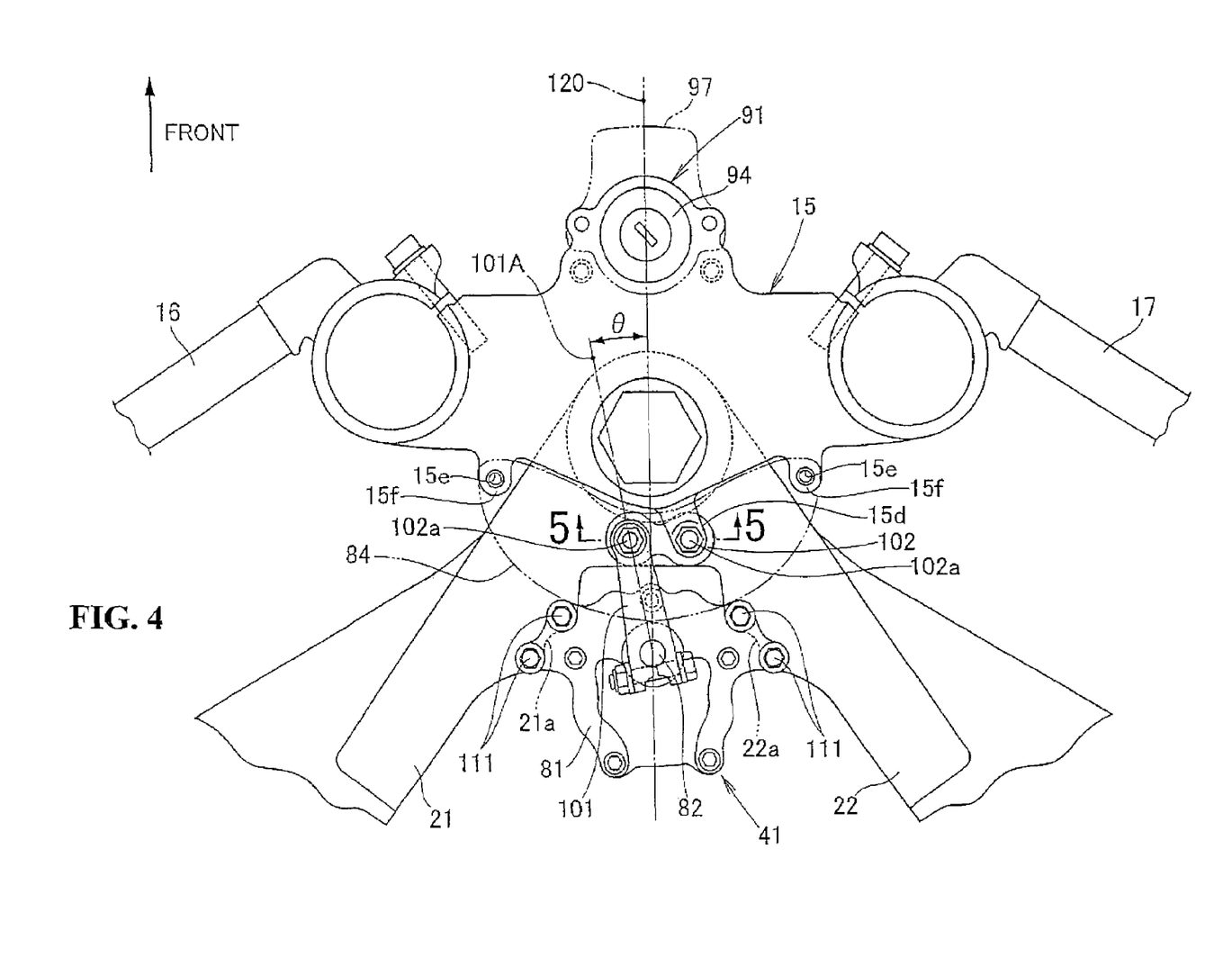
FIG. 4 is a view on arrow 4 of FIG. 2.

FIG. 4 is a view on arrow 4 of FIG. 2, showing the front portion of the vehicle body when the front wheel 14 is steered to a straight ahead position.

The top bridge 15 includes a steering damper mounting portion 15d and rearward protrusions 15f, 15f, all disposed on a rear portion thereof. More specifically, the second link 102 is mounted to the steering damper mounting portion 15d. The rearward protrusions 15f, 15f include internal threads 15e, 15e formed therein, in which the screws 115, 115 (see FIG. 3) for mounting the link cover 84 are to be screwed.

The steering damper mounting portion 15d is disposed on the right side relative to a vehicle body centerline 120 extending in a longitudinal direction of the vehicle. The vehicle body centerline 120 passes through an axis of the input shaft 82 of the steering damper main body 81.

The steering damper main body 81 is mounted to inner bulges 21a, 22a disposed on the inside at the front portions of the main frames 21, 22 using a plurality of bolts 111.

The first link 101 extends in a direction, in which a centerline 101A thereof is inclined counterclockwise at an angle of θ relative to the vehicle body centerline 120. The second link 102 extends in a vehicle width direction and rightwardly from a connection with the first link 101 and is connected to the steering damper mounting portion 15d of the top bridge 15.

Figure 5:
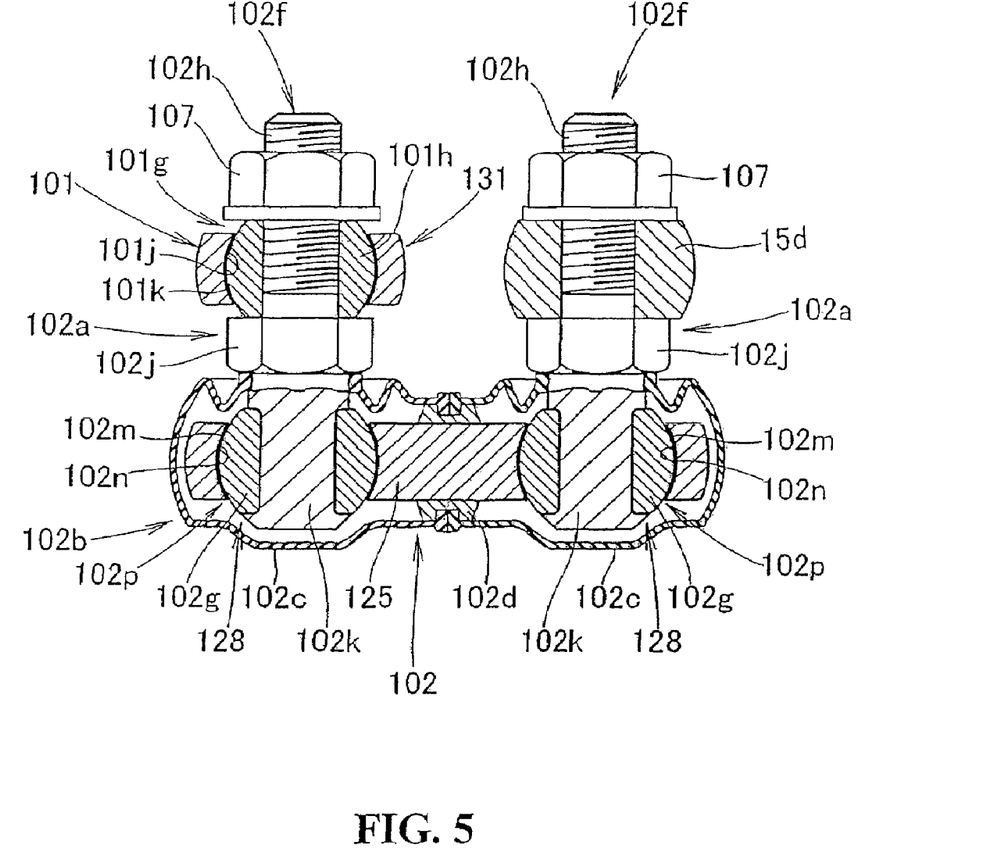
FIG. 5 is a cross-sectional view taken along line 5-5 of FIG. 4.

FIG. 5 is a cross-sectional view taken along line 5-5 of FIG. 4. The second link 102 includes a bar-like link main body 125, the bolt members 102a, 102a, the cover member 102b, and a cover connection body 102d. The bolt members 102a, 102a are rotatably and pivotally movably mounted on both ends of the link main body 125. The cover member 102b covers a connection between the link main body 125 and each of the bolt members 102a, 102a, and the link main body 125. The cover connection body 102d connects two cover half bodies 102c, 102c that make up the cover member 102b.

The bolt member 102a includes a shank 102f and a joint forming member 102g fitted on one end of the shank 102f. Further, the shank 102f includes a first shank portion 102h, a hexagon head 102j, and a second shank portion 102k. The first shank portion 102h has external threads formed thereon. The head 102j is adjacent to the first shank portion 102h. The second shank portion 102k is adjacent to the head 102j.

The link main body 125 includes a hole portion 102p formed therein. The hole portion 102p has a spherical inner surface 102n formed therein that is slidably fitted with a spherical outer surface 102m formed on the joint forming member 102g.

The joint forming members 102g, 102g and the link main body 125 constitute ball joints 128, 128.

The first link 101 includes a hole portion 101g formed at a leading end thereof. A joint forming member 101h is fitted into this hole portion 101g.

The hole portion 101g includes a spherical inner surface 101j. A spherical outer surface 101k formed in the joint forming member 101h is slidably fitted in the inner surface 101j.

The first link 101 and the joint forming member 101h constitute a ball joint 131.

Operation of the steering damper 41 described heretofore will be next described.

Figure 6:
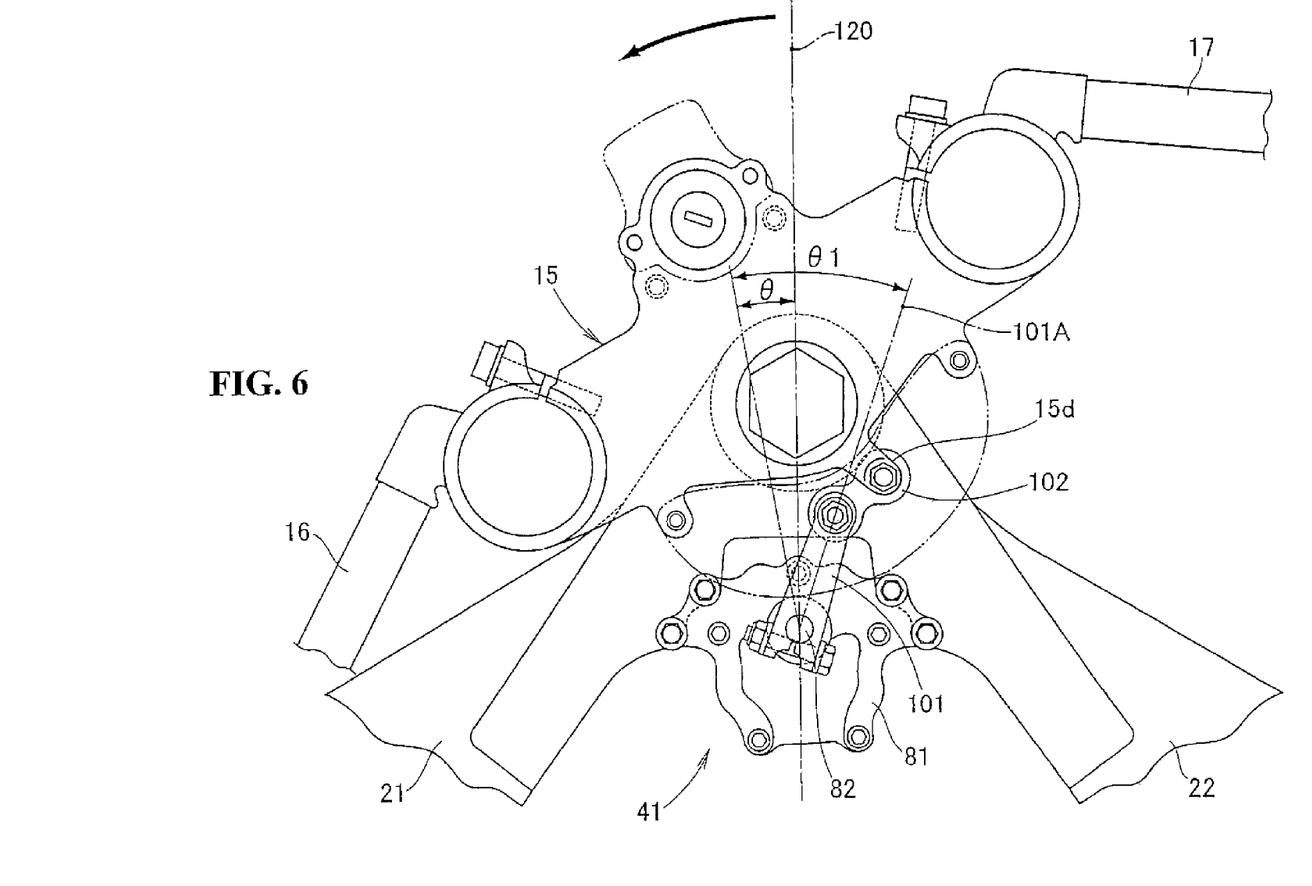
FIG. 6 is a first operation drawing showing operation of the steering damper according to the embodiment of the present invention.
Figure 7:
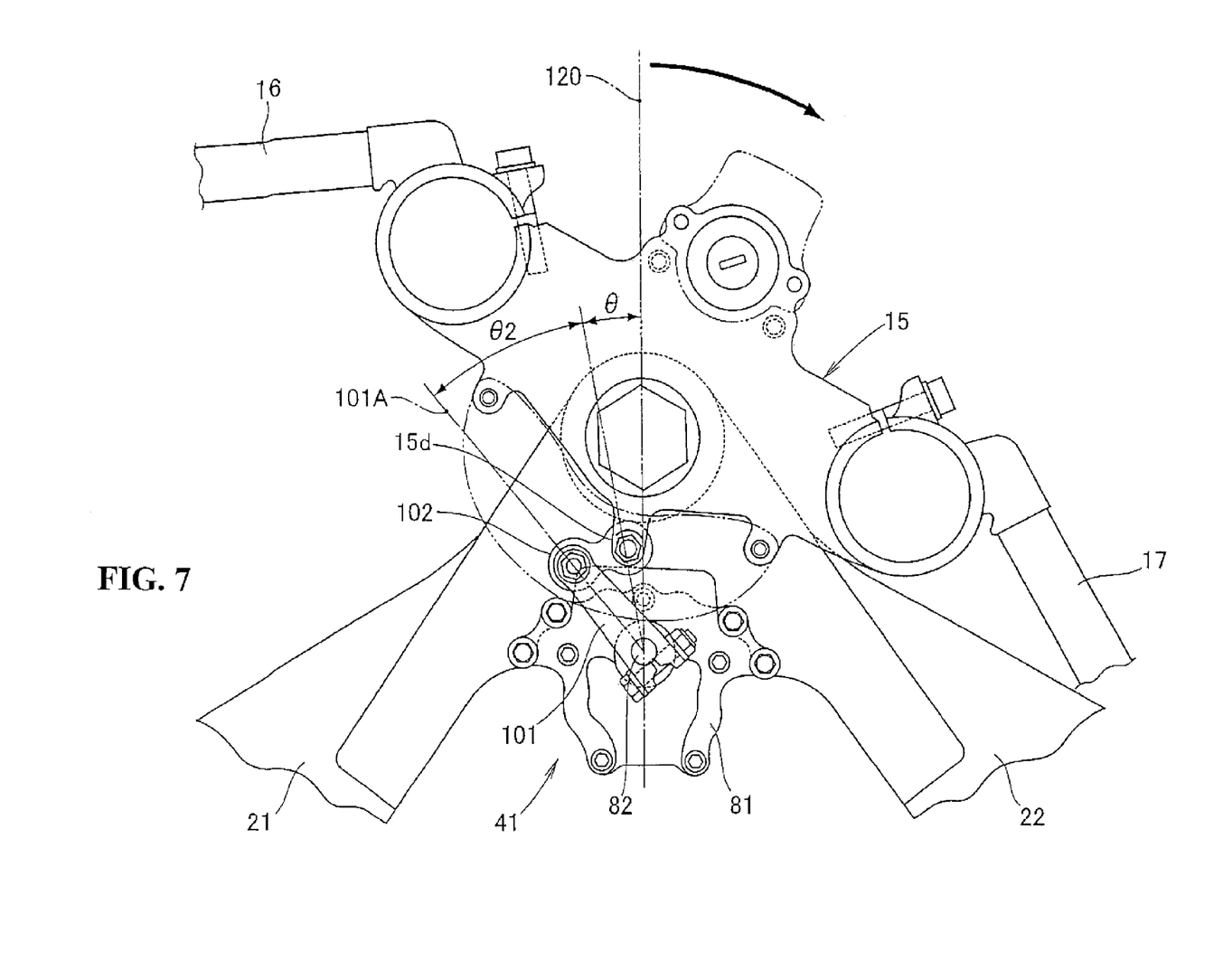
FIG. 7 is a second operation drawing showing operation of the steering damper according to the embodiment of the present invention.

FIG. 6 is a first operation drawing showing the operation of the steering damper 41 according to an embodiment of the present invention. FIG. 7 is a second operation drawing showing the operation of the steering damper 41 according to an embodiment of the present invention.

Referring to FIG. 6, turning the handlebars 16, 17 fully counterclockwise causes the first link 101 of the steering damper 41 (more specifically, the centerline 101A of the first link 101) to swing clockwise through an angle θ1 about the input shaft 82 from the position shown in FIG. 4.

Referring to FIG. 7, turning the handlebars 16, 17 filly clockwise causes the first link 101 of the steering damper 41 (more specifically, the centerline 101A) to swing counterclockwise through an angle θ2 about the input shaft 82 from the position shown in FIG. 4. Herein, θ1=θ2.

As described above with reference to FIGS. 1, 2, and 4, an embodiment of the present invention provides the saddle riding type vehicle 10 having the steering damper 41. The vehicle 10 includes the vehicle body frame 11 the head pipe 12, the front fork 13, and the top bridge 15. More specifically, the head pipe 12 is disposed at the front end of the vehicle body frame 11. The front fork 13, which supports the front wheel 14, is steerably disposed on the head pipe 12. The top bridge 15 connects the left and right upper ends of the front fork 13. In this vehicle 10, the steering damper 41 is interposed between the top bridge 15 and the vehicle body frame 11 (more specifically, the main frames 21, 22). Further, the top bridge 15 includes the steering damper mounting portion 15d, to which the steering damper 41 is mounted, disposed rearwardly of the head pipe 12 and downwardly of the upper surface 15a of the top bridge 15. The steering damper 41 includes the steering damper main body 81 disposed on the upper portion of the main frames 21, 22 and the first link 101 disposed on the input shaft 82 of the steering damper main body 81. The first link 101 extends in the forward direction of the vehicle body. The steering damper mounting portion 15*d* and the first link 101 are pivotally movably connected to each other.

As a result, the steering damper 41 can be disposed at an even lower position and the link cover 84 for covering the steering damper 41 can also be disposed at a lower position. This allows the front portion of the vehicle body of the saddle riding type vehicle 10 to be built even more compactly.

As described above with reference to FIGS. 4 and 5, according to an embodiment of the present invention, the steering damper mounting portion 15*d* and the first link 101 are connected via the second link 102. Further, the second link 102 is disposed downwardly of the steering damper mounting portion 15*d* and the first link 101.

The steering damper 41 can therefore be disposed at an even lower position.

According to an embodiment of the present invention, the second link 102 extends in the vehicle width direction when the front wheel 14 is steered into the straight ahead position.

Accordingly, the steering damper 41 can be disposed at a position even closer to the top bridge 15 while ensuring a sufficient overall length of the first link 101. The area around the head pipe 12 can therefore be built even more compactly.

According to an embodiment of the present invention, the steering damper mounting portion 15*d* and the connection of the first link 101 to the second link 102 are disposed opposite to each other relative to the vehicle body centerline 120 extending in the longitudinal direction of the vehicle body when the front wheel 14 is steered into the straight ahead position.

The second link 102 can therefore be disposed more toward the center in the vehicle width direction. The area around the head pipe 12 can therefore be built even more compactly.

In accordance with an embodiment of the present invention, the area upward of part of the link mechanism 83 of the steering damper 41 is covered by the link cover 84 as shown in FIG. 2. An area upward of the steering damper main body 81 may, instead, be covered by the front cover 66.

The saddle riding type vehicle having the steering damper according to the embodiment of the present invention is preferably adaptable to competition vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle riding vehicle having a steering damper, the vehicle comprising:
   a vehicle body frame;
   a head pipe disposed at a front end of the vehicle body frame;
   a front fork steerably disposed on the head pipe, the front fork for supporting a front wheel; and
   a top bridge connecting left and right upper ends of the front fork, the steering damper being interposed between the top bridge and the vehicle body frame;
   wherein the top bridge includes a steering damper mounting portion, to which the steering damper is mounted, disposed rearwardly of the head pipe and downwardly of an upper surface of the top bridge;
   the steering damper includes a steering damper main body disposed on an upper portion of the vehicle body frame and a first link disposed on an input shaft of the steering damper main body, the first link extending in a forward direction of a vehicle body; and
   the steering damper mounting portion and the first link are pivotally movably connected to each other;
   wherein the steering damper mounting portion and the first link are connected via a second link, and
   the second link is disposed downwardly of the steering damper mounting portion and the first link.

2. The saddle riding vehicle according to claim 1, wherein the second link extends in a vehicle width direction when the front wheel is steered into a straight ahead position.

3. The saddle riding vehicle according to claim 2, wherein the steering damper mounting portion and a connection of the first link to the second link are disposed opposite to each other relative to a vehicle body centerline extending in a longitudinal direction of the vehicle body when the front wheel is steered into the straight ahead position.

4. The saddle riding vehicle according to claim 1, wherein the steering damper mounting portion and a connection of the first link to the second link are disposed opposite to each other relative to a vehicle body centerline extending in a longitudinal direction of the vehicle body when the front wheel is steered into the straight ahead position.

5. The saddle riding vehicle according to claim 1, wherein the first link includes a first end secured to the input shaft of the steering damper main body and a second end secured to a first end of the second link.

6. The saddle riding vehicle according to claim 5, wherein the second link includes a second end operatively connected to a steering damper mounting portion of the top bridge.

7. The saddle riding vehicle according to claim 1, and further including ball joints operatively connecting the first link and the second link together.

8. The saddle riding vehicle according to claim 1, wherein the first link is inclined counterclockwise at an angle θ relative to a vehicle body centerline.

9. The saddle riding vehicle according to claim 8, wherein the second link includes a first end connected to the first link, said second link extending in a vehicle width direction from the connection with the first link, said second link including a second end operatively connected to the top bridge.

10. A steering damper adapted for use with a vehicle comprising:
    a top bridge adapted to connect a left upper end of a left front fork and a right upper end of a right front fork;
    a steering damper being interposed between the top bridge and the left and right front forks;
    a steering damper mounting portion formed on the top bridge, said steering damper being mounted being disposed rearwardly of a head pipe and downwardly of an upper surface of the top bridge;
    a steering damper main body operatively connected a vehicle body frame; and
    a first link disposed on an input shaft of the steering damper main body, the first link extending in a forward direction of a vehicle body;
    said steering damper mounting portion and the first link being pivotally movably connected to each other;
    wherein the steering damper mounting portion and the first link are connected via a second link, and
    the second link is disposed downwardly of the steering damper mounting portion and the first link.

11. The steering damper according to claim 10, wherein the second link extends in a vehicle width direction when a front wheel is steered into a straight ahead position.

12. The steering damper according to claim 11, wherein the steering damper mounting portion and a connection of the first link to the second link are disposed opposite to each other relative to a vehicle body centerline extending in a longitudinal direction of the vehicle body when a front wheel is steered into the straight ahead position.

13. The steering damper according to claim 10, wherein the steering damper mounting portion and a connection of the first link to the second link are disposed opposite to each other relative to a vehicle body centerline extending in a longitudinal direction of the vehicle body when a front wheel is steered into the straight ahead position.

14. The steering damper according to claim 10, wherein the first link includes a first end secured to the input shaft of the steering damper main body and a second end secured to a first end of the second link.

15. The steering damper according to claim 14, wherein the second link includes a second end operatively connected to the steering damper mounting portion of the top bridge.

16. The steering damper according to claim 10, and further including ball joints operatively connecting the first link and the second link together.

17. The steering damper according to claim 10, wherein the first link is inclined counterclockwise at an angle $\theta$ relative to a vehicle body centerline.

18. The steering damper according to claim 17, wherein the the second link includes a first end connected to the first link, said second link extending in a vehicle width direction from the connection with the first link, said second link including a second end operatively connected to the top bridge.

\* \* \* \* \*